United States Patent
Tamura et al.

(10) Patent No.: US 6,707,500 B1
(45) Date of Patent: *Mar. 16, 2004

(54) IMAGE PICKUP APPARATUS WITH CORRECTION OF HELD EXPOSURE PARAMETERS AND LENS SPHERICAL ABERRATION CORRECTION

(75) Inventors: Kyoji Tamura, Kanagawa-ken (JP); Hideyuki Arai, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/614,361

(22) Filed: Mar. 12, 1996

(30) Foreign Application Priority Data

Mar. 17, 1995 (JP) .............................. 7-058905
Apr. 6, 1995 (JP) .............................. 7-081215

(51) Int. Cl.⁷ .............................................. H04N 5/235
(52) U.S. Cl. ..................... 348/362; 348/229.1; 348/347
(58) Field of Search ................................ 348/362, 363, 348/229.1, 228.1, 364, 221.1, 230.1

(56) References Cited

U.S. PATENT DOCUMENTS

| | | | | |
|---|---|---|---|---|
| 4,814,811 A | * | 3/1989 | Saito et al. ................ | 354/412 |
| 5,083,209 A | * | 1/1992 | Inoue et al. ................ | 358/228 |
| 5,410,225 A | * | 4/1995 | Ishii et al. .................. | 348/229 |
| 5,486,894 A | * | 1/1996 | Fujibayashi ................. | 354/446 |
| 5,541,650 A | * | 7/1996 | Kondo ........................ | 348/229 |
| 5,543,837 A | * | 8/1996 | Aoki et al. .................. | 348/264 |
| 5,610,654 A | * | 3/1997 | Parulski et al. ............. | 348/229 |
| RE35,775 E | * | 4/1998 | Betensky et al. ........... | 359/692 |
| 5,742,437 A | * | 4/1998 | Eguchi et al. .............. | 359/739 |
| 5,959,670 A | * | 9/1999 | Tamura et al. ............. | 348/364 |
| 5,978,027 A | * | 11/1999 | Takeda ....................... | 348/364 |
| 6,115,064 A | * | 9/2000 | Mogi .......................... | 348/358 |
| 6,249,317 B1 | * | 6/2001 | Hashimoto et al. ......... | 348/364 |

\* cited by examiner

*Primary Examiner*—Ngoc-Yen Vu
*Assistant Examiner*—Jacqueline Wilson
(74) *Attorney, Agent, or Firm*—Robin, Blecker & Daley

(57) ABSTRACT

In an image pickup apparatus, when the focal length of a zoom lens is caused to change while the apparatus is in a state of being AE locked to retain an exposure control state of an exposure control circuit which is arranged to control the state of exposure according to a video signal, the apparatus is capable of maintaining the state of exposure obtained when the AE lock is made by correcting any change in the state of exposure caused by a change in F number resulting from the change of the focal length.

19 Claims, 9 Drawing Sheets

FIG. 5

LUT 3 (F2.8)

| FOCAL LENGTH | CORRECTION DATA |
|---|---|
| WIDE | 0dB |
|  | 0dB |
|  | 0dB |
| ⋮ | ⋮ |
|  | 0dB |
| MIDDLE | 0dB |
|  | 0dB |
| ⋮ | ⋮ |
|  | 1.8dB |
| TELE | 2dB |

LUT 2 (F2.0)

| FOCAL LENGTH | CORRECTION DATA |
|---|---|
| WIDE | 0dB |
|  | 0dB |
|  | 0dB |
| ⋮ | ⋮ |
|  | 0dB |
| MIDDLE | 0dB |
|  | 0.5dB |
| ⋮ | ⋮ |
|  | 5dB |
| TELE | 6dB |

↓ (3)  ↓ (1)  ↓ (2)

LUT 1 (F1.4)

| FOCAL LENGTH | CORRECTION DATA |
|---|---|
| WIDE | 0dB |
|  | 0.5dB |
|  | 1dB |
| ⋮ | ⋮ |
|  | 5dB |
| MIDDLE | 6dB |
|  | 7dB |
| ⋮ | ⋮ |
|  | 10dB |
| TELE | 12dB |

IMAGE PICKUP APPARATUS WITH CORRECTION OF HELD EXPOSURE PARAMETERS AND LENS SPHERICAL ABERRATION CORRECTION

BACKGROUND OF THE INVENTION

1. Field of the Invention

This invention relates to the exposure control of an image pickup apparatus.

2. Description of the Related Art

A method of controlling the aperture of an iris, the storage time of an image sensor (electronic shutter) and the gain of an AGC (automatic gain control) circuit for keeping the level of video signals at a predetermined value is employed in general for exposure control in image pickup apparatuses such as video cameras or the like. An image pickup apparatus of this kind is arranged and operates as described below with reference to FIG. 1 which is a block diagram.

Referring to FIG. 1, a zoom lens 1 which has a variable focal length as a lens group is arranged to form the image of an object of shooting. An iris mechanism 2 is arranged either to be of an iris blade structure to control the quantity of incident light or to be in the form of liquid crystal means to control the quantity of transmission light. In this case, an iris is employed. An image sensor 3 is arranged to photo-electrically convert the incident light. A driving motor 6 is an IG meter or the like arranged to drive the iris mechanism 2. An image sensor control circuit 7 is arranged to control the image sensor 3 in such a way as to read out a photo-electrically converted signal and to control the signal storage time in a manner called an electronic shutter function.

A sample-and-hold (S/H) circuit 8 is arranged to sample the signal photo-electrically converted by the image sensor 3. An automatic gain control circuit (hereinafter referred to as AGC circuit) 9 is arranged to electrically amplify a signal. A camera signal processing circuit 10 is arranged to form a standard television signal by carrying out a gamma correcting process, a color separating process, a color-difference matrixing process, etc., and, after that, by adding synchronizing signals. The camera signal processing circuit 10 may be either an analog signal processing circuit which processes a signal in the form of an analog signal or a digital signal processing circuit which is arranged to analog-to-digital convert a video signal, to process the digital-converted signal and, after that, to digital-to-analog convert the signal. In this case, however, the camera signal processing circuit is an analog signal processing circuit.

A video tape recorder (hereinafter referred to as VTR) 11 is arranged to record a video signal on a tape. An electronic viewfinder (hereinafter referred to as EVF) 11 is provided for monitoring video images being picked up.

An exposure detecting circuit 13 is arranged to detect the state of exposure for the shooting object through a signal outputted from the AGC circuit 9. An exposure control circuit 22 is arranged to control the iris mechanism 2, the shutter speed of an electronic shutter which is controlled by the image sensor control circuit 7, the gain of the AGC circuit 9, etc., on the basis of a detection signal outputted from the exposure detecting circuit 13. An iris driving circuit 16 is arranged to operate, according to the output of the exposure control circuit 22, the motor 6 which drives the above-stated iris mechanism 2. A trigger key 14 is provided for inputting a trigger signal to perform an AE lock action by which an exposure control state is maintained.

The exposure control circuit 22 contains therein an exposure control computing part 22a which is arranged to compute control information for control over the AGC gain, the shutter speed of the electronic shutter and the amount of aperture of the iris according to the signal outputted from the exposure detecting circuit 13 indicating a state of exposure, such as an integrated value of luminance level, a data holding part 22h composed of an AGC data holding part 22b, an electronic shutter data holding part 22c and an iris data holding part 22d which are arranged respectively to hold, in response to the operation of the trigger key 14, control information on the AGC gain, the shutter speed of the electronic shutter and the amount of aperture of the iris outputted from the exposure control computing part 22a, and an AGC control part 22e, an electronic shutter control part 22f and an iris control part 22g which are arranged respectively to control the gain of the AGC circuit 9, the speed of the electronic shutter of the image sensor 3 and the amount of aperture of the iris mechanism 2 according to data of varied kinds supplied through the AGC data holding part 22b, the electronic shutter data holding part 22c and the iris data holding part 22d.

In order to obtain optimum video images by a simple shooting operation under various conditions, in the image pickup apparatus, the exposure detecting circuit 13 is arranged to detect changes in luminance of the object of shooting from a video signal, and the exposure control circuit 22 is arranged to select and correct exposure control parameters such as the aperture of the iris mechanism 2, the electronic shutter controlling the storage time of the image sensor 3, the gain of the AGC circuit 9, etc., on the basis of the detection signal from the exposure detecting circuit 13. The image pickup apparatus is thus arranged to perform control for making an optimum exposure always in a stable manner. Such an arrangement enables the automatic exposure control means to automatically carry out optimum exposure control, without recourse to any manual operation by the operator, even when the luminance of the object varies.

However, according to the above-stated automatic exposure control means, since the state of exposure is controlled always according to the luminance of the object image incident thereon through the zoom lens 1, the state of exposure control varies when the luminance of objects located around the main object of shooting happens to change due to a change taking place in focal length of the zoom lens 1, a motion of the main object or the like, even if the luminance of the main object does not vary.

Therefore, if the luminance of peripheral objects changes even when the state of exposure is in an optimum state for the main object of shooting, the state of control over the exposure comes to change and eventually becomes inapposite to the main object.

To cope with such a shooting condition, a means for holding a state of exposure called "AE lock means" have been developed to hold the apparatus in an apposite state of exposure control. The AE lock means is operated as follows. The operator watches the state of exposure on the image plane of the EVF 12 which is a monitoring means and inputs a trigger signal from the trigger key 14 when the operator wishes to keep the current state of exposure unvarying. In response to the trigger signal input, the data holding part 22h of the exposure control circuit 22 is brought into a holding state, in which amounts of correction computed by the exposure control computing part 22a at that time for correction of the exposure control parameters of varied kinds including the aperture of the iris mechanism 2, the speed of the electronic shutter controlling the storage time of the image sensor 3 and the gain of the AGC circuit 9 are held.

In a case where a difference in luminance between the main object and peripheral objects are too much to obtain an optimum state of exposure for the main object by the automatic exposure control means, like in shooting a person under a back-light condition or like in shooting a person illuminated with an excessive front spot light, the exposure state for the person, i.e., the main object, becomes too dark due to an adverse effect of a bright background to result in so-called "black blanking" or too bright to result in so-called "white blanking". Under such shooting conditions, the AE lock means is sometimes used to eliminate the adverse effect of the luminance of the peripheral objects by varying the focal length of the zoom lens 1 to zoom up the main object, performing an AE lock action when the exposure state for the main object is optimized, and, after that, shifting the focal length of the zoom lens 1 back to the original focal length so that the shooting operation is allowed to begin by adjusting the video image to the composition of picture desired by the operator.

The use of the AE lock means, however, still leaves a problem unsolved in the following point. Even when the quantity of incident light from the zoom lens 1 is unvarying and the iris mechanism 2 which limits the quantity of incident light remains in a constant state, the F number of the zoom lens 1 changes according to its focal length. The change of the F number then causes the quantity of light incident on the surface of the image sensor 3 to vary. Therefore, even if the AE lock action is performed in an optimum manner, the state of exposure obtained by the AE lock action comes to vary when the focal length of the zoom lens 1 is varied, although the state of control over the exposure parameters of the iris mechanism, the AGC circuit, the electronic shutter, etc., remains unchanged. Under such a condition, it is hardly possible to maintain an optimum state of exposure.

SUMMARY OF THE INVENTION

This invention is directed to the provision of an exposure control device and an image pickup apparatus which are advantageously adapted for a video camera having a zooming function.

It is, therefore, an object of this invention to provide an image pickup apparatus arranged to include AE lock means and yet to be capable of retaining an optimum state of exposure obtained when an AE lock action is performed, even if the focal length of a zoom lens is varied.

To attain this object, an image pickup apparatus arranged as a preferred embodiment of this invention comprises a zoom lens having a variable focal length and serving as a lens group for forming an image of an object, an image sensor for photo-electrically converting light incident through the zoom lens into a signal, signal processing means for processing the signal photo-electrically converted by the image sensor to form a video signal as a television signal, exposure control means for controlling a state of exposure according to the video signal, exposure state holding means for holding the state of exposure controlled by the exposure control means, focal length detecting means for detecting the focal length of the zoom lens, and exposure correcting means for correcting the state of exposure controlled by the exposure control means and held by the exposure state holding means, according to the focal length detected by the focal length detecting means.

According to another preferred embodiment of this invention, the signal processing means includes automatic gain control means for electrically amplifying the video signal, and the exposure correcting means is arranged to correct the state of exposure by controlling the gain of the automatic gain control means according to a change of the focal length of the zoom lens.

According to a further preferred embodiment of this invention, the exposure control means has an electronic shutter function to control a storage time of the image sensor, and the exposure correcting means is arranged to correct the state of exposure by controlling the storage time of the image sensor according to a change of the focal length of the zoom lens.

An image pickup apparatus arranged as a still camera further preferred embodiment of this invention comprises a zoom lens having a variable focal length and serving as a lens group for forming an image of an object, an image sensor for photo-electrically converting light incident through the zoom lens into a signal, iris means for limiting a quantity of the light incident on the image sensor, aperture state detecting means for detecting an aperture state of the iris means, signal processing means for processing the signal photo-electrically converted by the image sensor to form a video signal as a television signal, exposure control means for controlling a state of exposure according to the video signal, exposure state holding means for holding the state of exposure controlled by the exposure control means, focal length detecting means for detecting the focal length of the zoom lens, and exposure correcting means for correcting the state of exposure controlled by the exposure control means according to the focal length detected by the focal length detecting means and the aperture state detected by the aperture state detecting means.

It is a further object of this invention to provide an image pickup apparatus arranged such that, in a case where a zooming action is performed in an AE lock state in which an exposure state is maintained by the exposure state holding means, a change in exposure caused by a change in F number resulting from a change in the focal length of the zoom lens is corrected by detecting the change of the focal length and by correcting the state of exposure controlled by the exposure control means and held by the exposure state holding means.

These and further objects and features of this invention will become apparent from the following detailed description of preferred embodiments thereof taken in conjunction with the accompanying drawings.

BRIEF DESCRIPTION OF THE DRAWINGS

FIG. 5 shows by way of example a look-up table of F number correcting means of the first embodiment.

DETAILED DESCRIPTION OF THE PREFERRED EMBODIMENTS

First Embodiment

A first embodiment of this invention is described below with reference to drawings.

Figure 1:
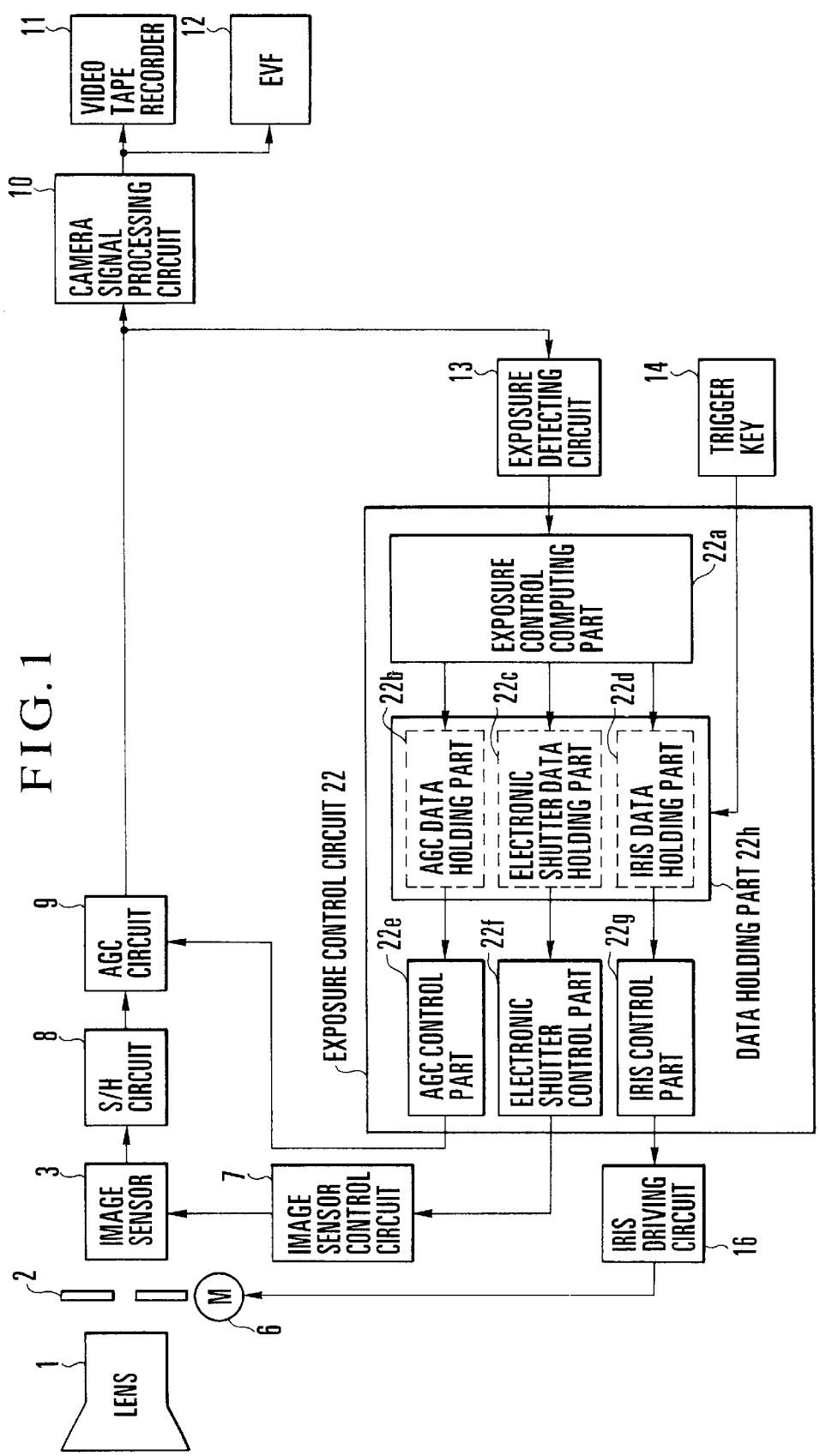
FIG. 1 is a block diagram showing the arrangement of a video camera which precedes this invention.
Figure 2:
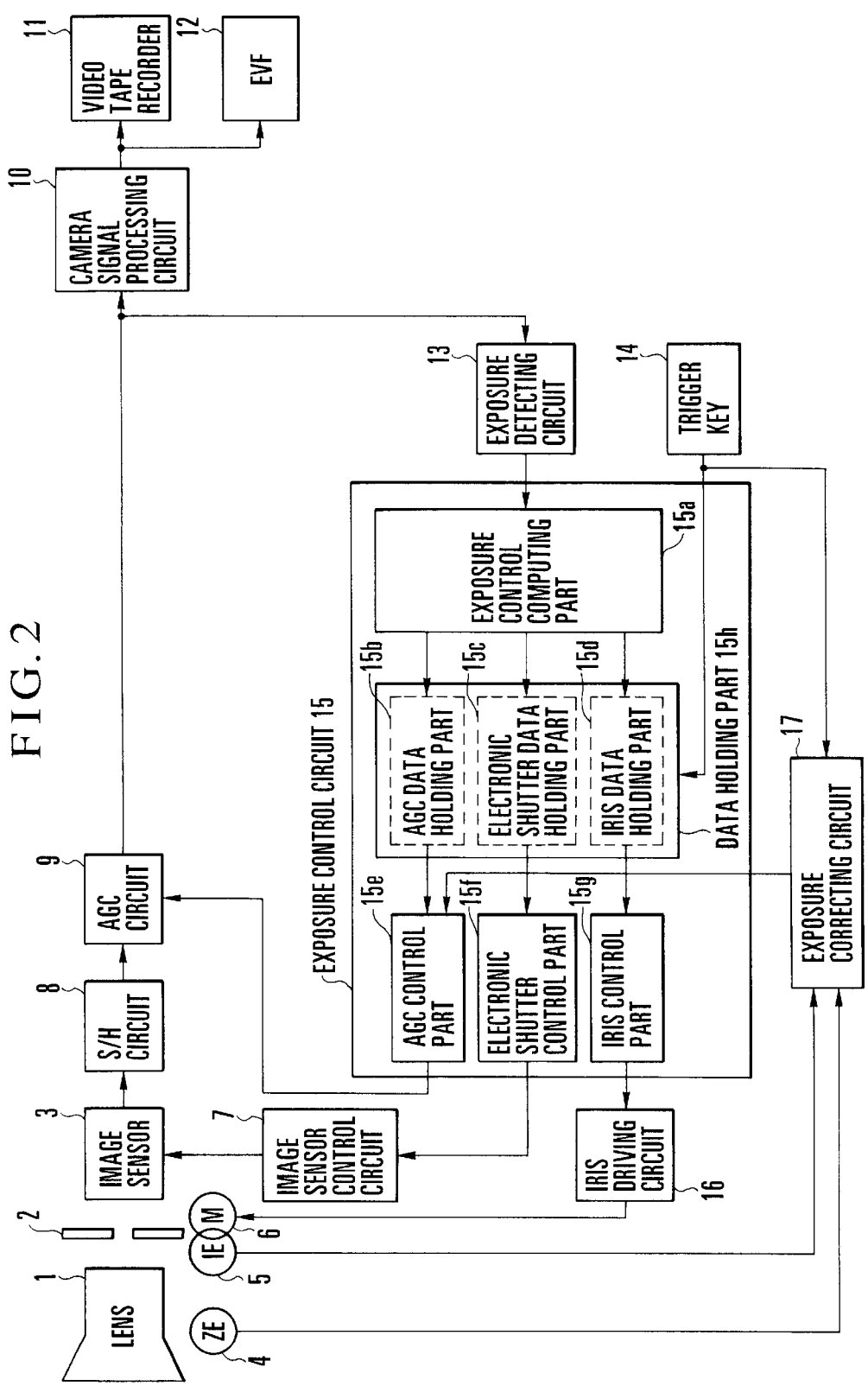
FIG. 2 is a block diagram showing the arrangement of a first embodiment of this invention.

FIG. 2 shows in a block diagram the arrangement of the first embodiment of this invention. In FIG. 1, parts indicated by the same reference numerals as those of FIG. 1 have the same functions as those of the example shown in FIG. 1 and, therefore, the details of them are omitted from the following description.

In the first embodiment, a video signal is processed in the same manner as in the prior art described, and the following parts are added to the parts of the prior art arrangement: a zoom encoder 4 which is employed as focal length detecting means for detecting the focal length of a zoom lens 1; an iris encoder 5 which is employed as aperture state detecting means for detecting the aperture state of an iris mechanism 2 employed as iris means; and an exposure correcting circuit 17 which is employed as exposure correcting means for correcting a change of the F number due to a change of the focal length of the zoom lens 1. Reference numeral 15 denotes an exposure control circuit employed as exposure control means.

The internal component elements 15a to 15h of the exposure control circuit 15 correspond respectively to the internal component elements 22a to 22h of the exposure control circuit 22 shown in FIG. 1, and are arranged in the same manner as those of the latter.

The exposure correcting circuit 17 employed as exposure correcting means according to this invention is provided with a look-up table (hereinafter referred to as LUT) which stores data to be used for correcting changes in luminance brought about by changes of the F number resulting from changes of the focal length of the zoom lens 1.

Figure 3:
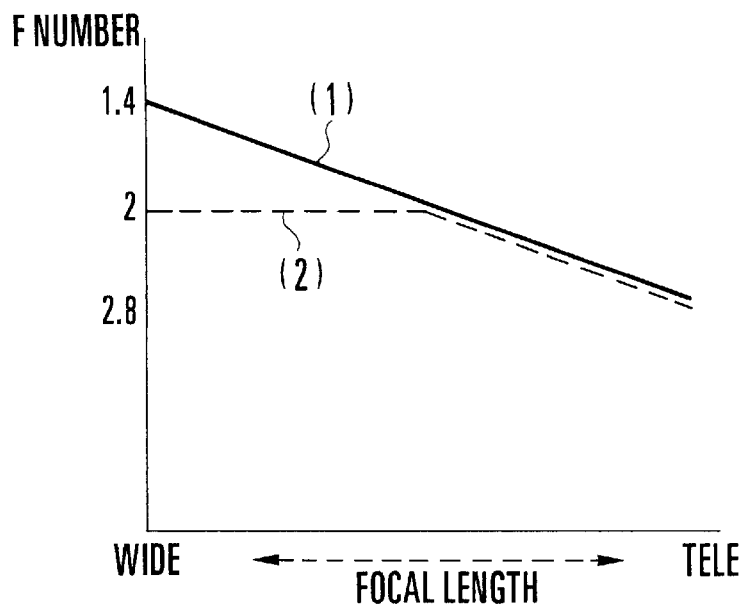
FIG. 3 shows the characteristic of F numbers in relation to the focal lengths of a zoom lens.

Now, assume that a characteristic of the F number with respect to the focal length of the zoom lens 1 is represented by a line (1) in FIG. 3. Luminance obtained on the image pickup plane of the image sensor 3 when the quantity of light incident through the zoom lens 1 is constant and the iris mechanism 2 is in its full-open state varies correspondingly with a change of the F number, as shown a line (1) in FIG. 4, with the luminance obtained when the focal length of the zoom lens 1 is at its wide-angle end assumed to be 100%. In FIG. 3, an abscissa axis shows the focal length of the zoom lens 1 while the ordinate axis shows the F number.

Figure 4:
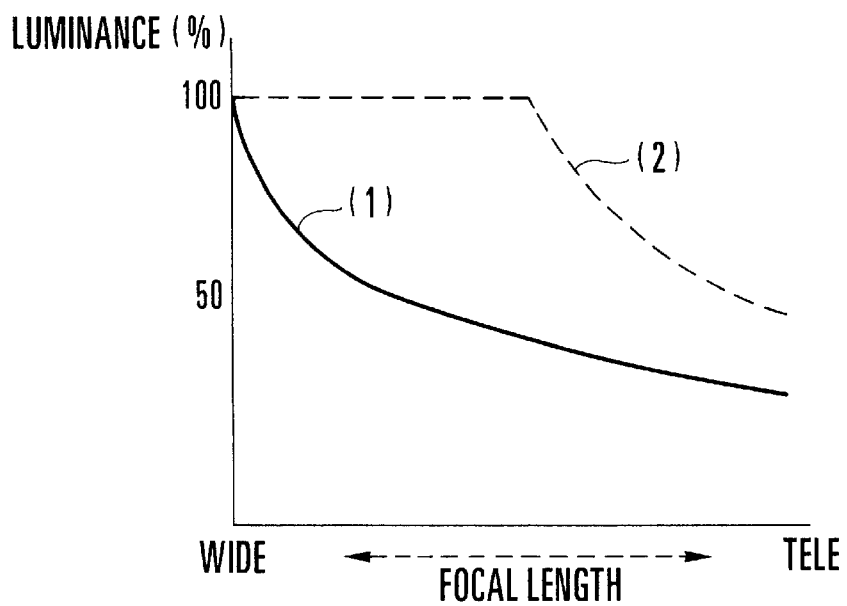
FIG. 4 shows changes taking place in luminance in relation to the focal length of the zoom lens.

The LUT (look-up table) arranged in the exposure correcting circuit 17 provides F number (aperture value) correction data for correcting the changes of luminance in relation to the focal length, as shown in FIG. 4, by means of the gain of the AGC circuit 9. In FIG. 4, an abscissa axis shows the focal length of the zoom lens 1 and the ordinate axis shows the luminance.

When the iris mechanism 2 is in a state of, for example, being stopped down to an aperture state of F2, a change of the F number of the zoom lens 1 is apparently represented as a line (2) in FIG. 3 on the surface of the image sensor 2. Then, the luminance on the image pickup plane of the image sensor 2 changes as represented by a line (2) in FIG. 4.

Since a change of the F number with respect to the focal length varies with the aperture state of the iris mechanism 2, the F number correction data provided in the exposure correcting circuit 17 is arranged in the LUT for each of the aperture states of the iris mechanism 2 as shown in FIG. 5.

The operation of an AE lock means which represents a feature of this invention is next described below.

Normally, the automatic exposure control means operates in the same manner as the preceding example described above, as follows. The exposure detecting circuit 13 detects from a video signal any change of exposure caused by a change of the object of shooting. At the exposure control circuit 15, the exposure control computing part 15a selects, on the basis of the detection signal provided by the exposure detecting circuit 13, exposure control parameters including the aperture state of the iris mechanism 2, the speed of the electronic shutter which controls the storage time of the image sensor 3, the gain of the AGC circuit 9, etc., and then computes and determines the amount of correction of each of those parameters to stably optimize the exposure.

Information on the selection of the exposure control parameters and the correction amounts of those parameters is supplied through the AGC data holding part 15b, the electronic shutter data holding part 15c and the iris data holding part 15d to the AGC control part 15e, the electronic shutter control part 15f and the iris control part 15g to control the AGC circuit 9, the image sensor control circuit 7 and the iris driving circuit 16, so that the exposure can be always stably optimized.

The AE lock means is operated when the operator wishes to maintain an optimized state of exposure. To be more specific, the trigger key 14 is operated to input a trigger signal. In response to the trigger signal, the data holding parts 15b to 15d within the data holding part 15h of the exposure control circuit 15 are brought into their holding states. As a result, the correction amounts of the exposure control parameters computed at that point of time by the exposure control computing part 15a, including the aperture state of the iris mechanism 2, the speed of the electronic shutter which controls the storage time of the image sensor 3 and the gain of the AGC circuit 9, are retained, so that the state of exposure obtained at that time can be maintained.

At that time, the trigger signal from the trigger key 14 is inputted also to the exposure correcting circuit 17. In response to the trigger signal, the exposure correcting circuit 17 detects the aperture state of the iris mechanism 2 obtained when the AE lock action is operated, from the iris encoder 5 which serves as aperture state detecting means, and detects the focal length of the zoom lens 1 from the zoom encoder 4 which serves as focal length detecting means. Then, the exposure correcting circuit 17 selects one of the LUTs corresponding to the aperture state of the iris mechanism 2 detected, selects F-number correction data corresponding to the focal length of the zoom lens 1 detected from the detected LUT, and sets the F-number correction data as reference data.

When the focal length of the zoom lens 1 has varied, the focal length newly obtained then is detected, and F-number correction data corresponding to the new focal length is selected from the above-stated detected LUT.

The F-number correction data which is thus selected is compared with the above-stated reference data to obtain a necessary amount of correction.

For example, assuming that the reference data obtained when the AE lock is operated is in a state of a part (1) in the LUT 1 of FIG. 5, the amount of correction employed when the focal length changes to a state of a part (2) becomes +6 dB, or the amount of correction employed when the focal length changes to a state of a part (3) becomes −5 dB. Such an amount of correction is used for correcting the data of gain of the AGC circuit 9 held by the data holding part 15h when the AE lock is operated. The gain of the AGC circuit 9 is thus controlled according to the result of the correction.

With the operation performed in the above-stated manner, the state of exposure is controlled to keep it always in an optimum state by constantly detecting a change of the focal length and by correcting a change of luminance due to a change of the F number of the lens through the gain of the AGC circuit 9 every time the focal length varies.

Second Embodiment

Figure 6:
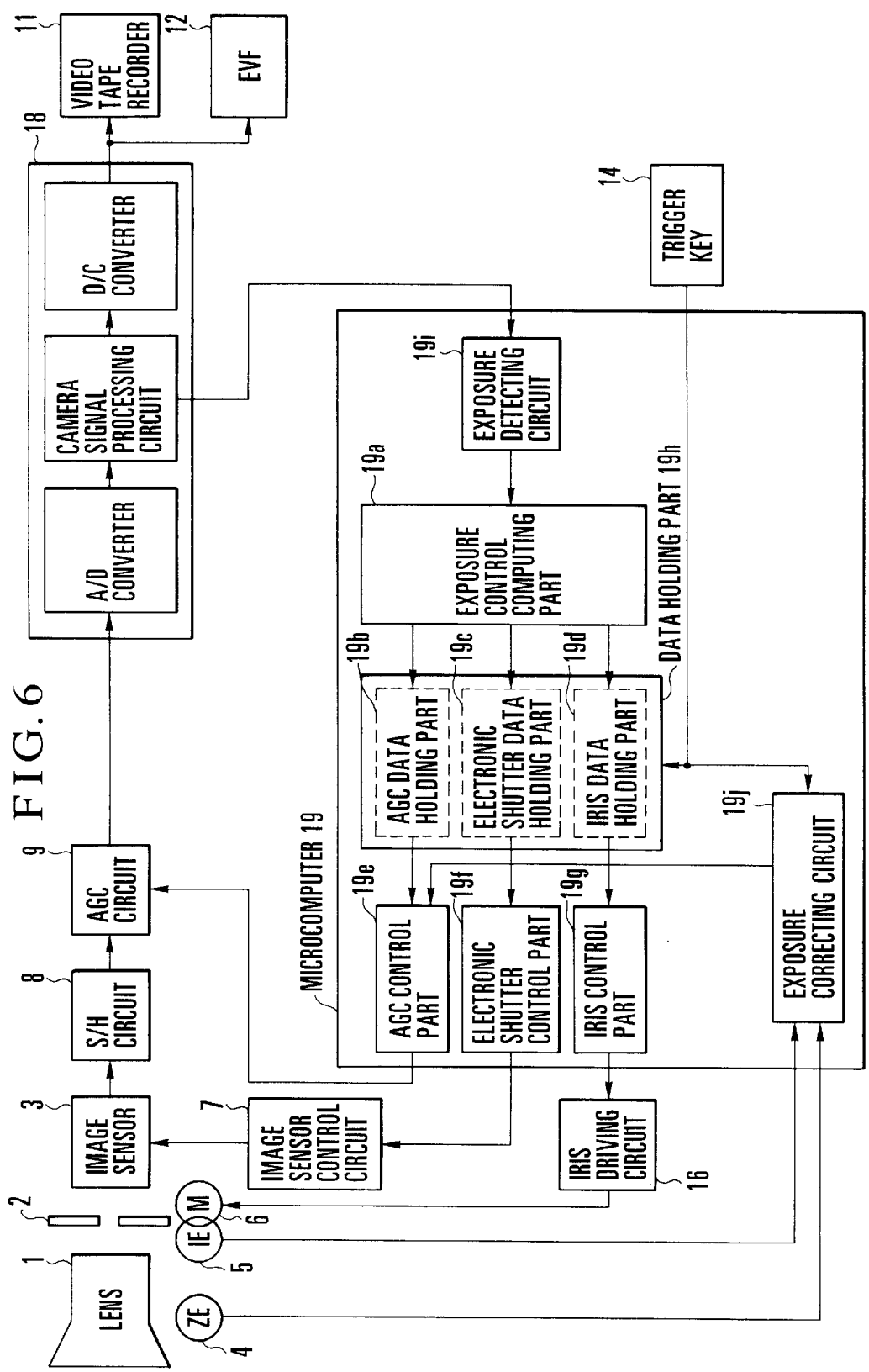
FIG. 6 is a block diagram showing the arrangement of a second embodiment of this invention.

FIG. 6 shows in a block diagram the arrangement of a second embodiment of this invention.

In the case of the second embodiment, the camera signal processing circuit 10 of the first embodiment is replaced with a camera signal processing circuit 18 which performs a digital signal processing action. The digital signal processing arrangement enables the apparatus to carry out the processes of the exposure detecting circuit 13, the exposure control circuit 15 and the exposure correcting circuit 17 of the first embodiment in a digital signal processing manner with a microcomputer 19, so that the apparatus can be more simply configured.

The circuit functions and the correcting action of the second embodiment are similar to those of the first embodiment and are, therefor, omitted from description.

Third Embodiment

Figure 7:
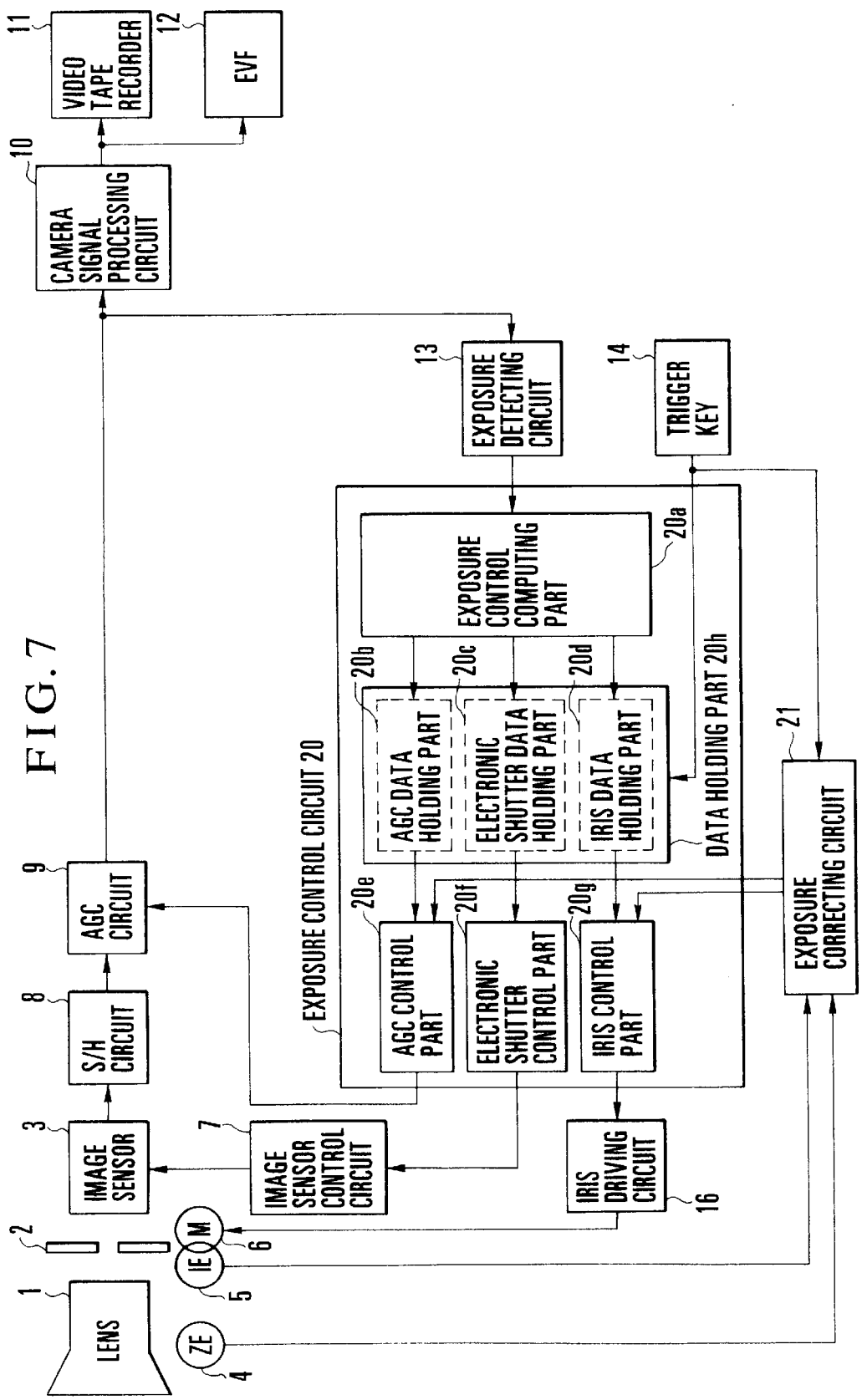
FIG. 7 is a block diagram showing the arrangement of a third embodiment of this invention.

FIG. 7 shows in a block diagram the arrangement of a third embodiment of this invention.

In the first embodiment, the F-number correction data is provided in the exposure correcting circuit 17 for correcting, through the gain of the AGC circuit 9, a change of the luminance due to a change of the F number which varies with the focal length of the zoom lens 1. While the first embodiment is thus arranged to carry out the correction through the gain of AGC, the third embodiment is arranged to be capable of making the same correction not only through the gain of AGC but also through the speed of the electronic shutter which is arranged to control the storage time of the image sensor 3. For this purpose, LUTs of an exposure correcting circuit 21 of the third embodiment are provided with F-number correction data for correction through the electronic shutter.

The third embodiment is arranged to perform a correcting action in the same manner as the first embodiment although it differs in correction parameters.

Further, as for the correcting parameters, the third embodiment may be arranged to make correction by using both the AGC and the electronic shutter.

According to the arrangement of each of the embodiments described above, when the zoom lens is driven under a condition in which the state of exposure controlled by the exposure control means is maintained by the exposure state holding means, the state of exposure thus maintained is corrected by the exposure correcting means according to a change of the focal length. Therefore, the optimum state of exposure obtained when the exposure state holding action is performed can be retained to give video images as desired by the operator.

According to the arrangement of the first embodiment described, since the correction by the exposure correcting means is carried out by controlling the gain of the AGC (automatic gain control) circuit, the state of exposure controlled according to the focal length of the zoom lens is corrected to permit fine correction, so that the optimum state of exposure obtained when the exposure state holding action is performed can be kept unchanged to give video images as desired by the operator even if the focal length of the zoom lens comes to change thereafter.

Further, according to the arrangement of the embodiment described, since the correction by the exposure correcting means is carried out by controlling the storage time of the image sensor, the state of exposure controlled according to the focal length of the zoom lens is corrected. This arrangement broadens a correctable range, so that the optimum state of exposure obtained when the exposure state holding action is performed can be kept unchanged to give video images as desired by the operator even if the focal length of the zoom lens comes to change thereafter.

Further, according to the arrangement of the embodiment described, since the correction by the exposure correcting means is carried out by controlling the gain of automatic gain control means and the signal storage time of the image sensor, the state of exposure controlled according to the focal length of the zoom lens is corrected. This arrangement not only broadens a correctable range but also permits finer correction, so that the optimum state of exposure obtained when the exposure state holding action is performed can be kept unchanged to give video images as desired by the operator even if the focal length of the zoom lens comes to change thereafter.

Further, according to the arrangement of the embodiment described, in a case where the zoom lens is driven while the exposure state controlled by the exposure control means is maintained by the exposure state holding means, the state of exposure thus maintained is corrected according to the focal length of the zoom lens and the aperture state of the iris mechanism. This arrangement makes accurate correction possible under various shooting conditions, so that the optimum state of exposure obtained when the exposure state holding action is performed can be kept unchanged to give video images as desired by the operator even if the focal length of the zoom lens comes to change.

Further, according to the arrangement of the embodiment described, the AE lock means can be arranged to be capable of keeping the optimum state of exposure obtained when the AE lock action is performed even if the focal length of the zoom lens is caused to vary. Despite of the use of the AE lock means, therefore, shooting can be performed at a desired angle of view by varying the focal length, so that video images of various objects can be taken most appositely to shooting conditions.

Fourth Embodiment

A fourth embodiment of this invention is next described. The fourth embodiment is a video camera which is of the kind being equipped with a zoom lens of a high magnification, in a recent fashion, and is arranged to be capable of preventing deterioration of image quality to give images of a high quality and a high definition. The background of this embodiment is first described below.

Video cameras, camera-integrated type VTRs or the like have recently become very popular and saliently advanced. With respect to their performance, it has become very important to arrange them to have many functions, to be small in size and light in weight and to have a high performance. As a part of the efforts to attain this purpose, the lens itself must be arranged in a smaller size and to have a greater magnifying power.

The desire of people in general have come to call for the so-called "camcorders" of a smaller size and a higher magnifying power. Hence, the size of the image sensor has changed from 1/3 inch to 1/4 inch. The magnifying power of the lens has been increased to 10 magnifications, to 12 magnifications, to 16 magnifications and so on. Since the lens of a smaller size and a higher magnifying power must have adequate characteristics, it has become extremely difficult to develop a lens. Hence, in developing a lens of a very small size and a very high magnifying power, the lens tends to have somewhat inadequate spherical aberration at some focal length when the iris is fully open or a degradation in feeling of resolution due to a phenomenon called flare. In view of this, the fourth embodiment of this invention is developed to provide an image pickup apparatus which is arranged to be capable of correcting the spherical aberration by stopping down the iris mechanism for a focal length at which the spherical aberration becomes unacceptable at a full-open aperture.

Figure 8:
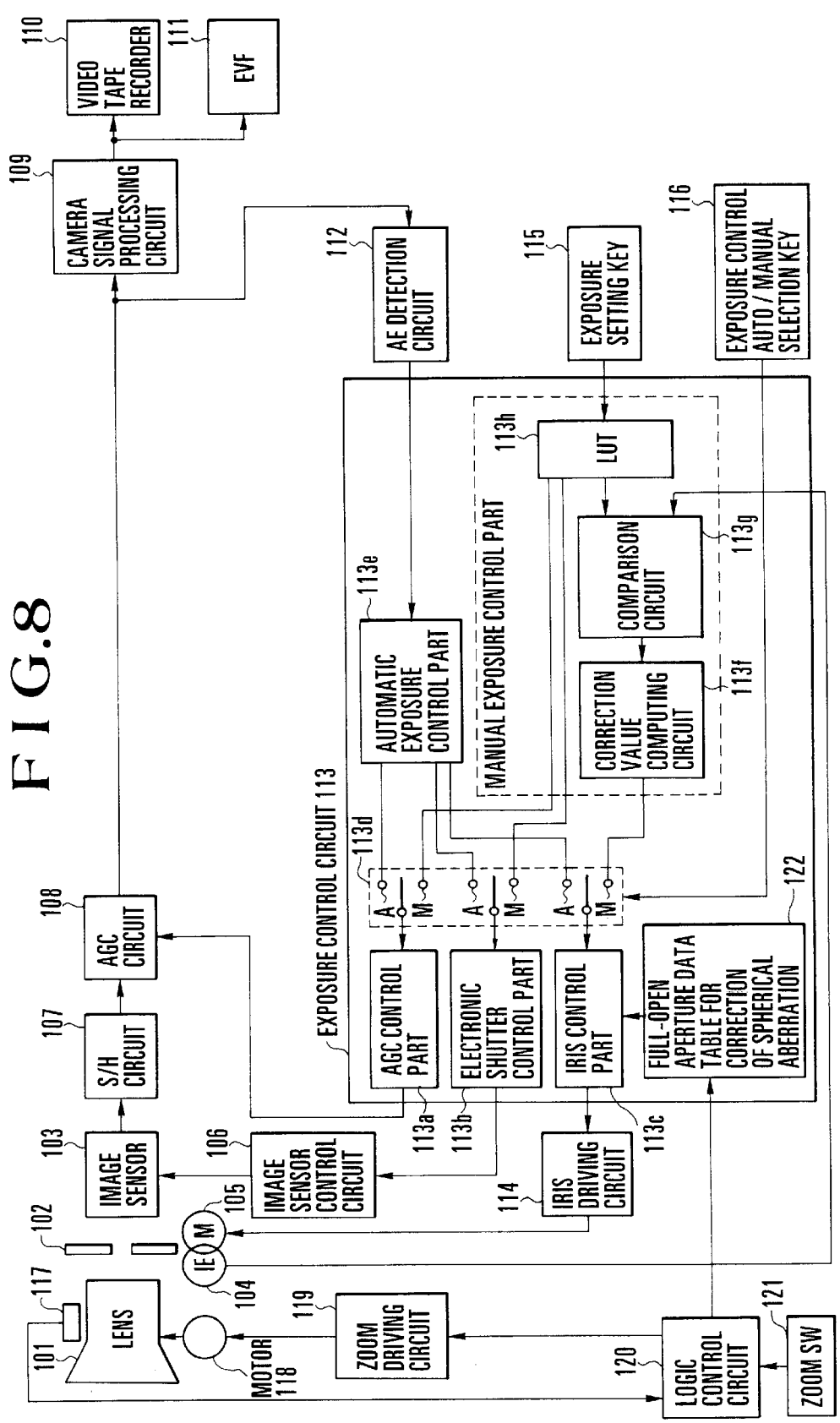
FIG. 8 is a block diagram showing the arrangement of a fourth embodiment of this invention.

FIG. 8 shows the arrangement of the fourth embodiment. In this case, this invention is applied to a camera-integrated type VTR.

Referring to FIG. 8, a zoom lens 101 is a lens group arranged to form an image of an object of shooting. An iris mechanism 102 may be either of an iris blade structure arranged to control the quantity of incident light or a liquid crystal means arranged to control the quantity of transmitted light. In this case, however, an iris is employed as the iris mechanism 102. An image sensor 103 is composed of a CCD or the like and is arranged to photo-electrically convert light incident thereon. Aperture detecting means 104, i.e., an iris encoder which is composed of a Hall element or the like is arranged to detect the state (an aperture value or an amount of opening) of the iris mechanism 102. A driving motor 105 which is an IG meter or the like is arranged to drive the iris mechanism 102. An image sensor control circuit 106 is arranged to control the storing and reading actions of the image sensor 103, to obtain a photo-electrically converted signal and to control the so-called electronic shutter function for controlling the signal storage time of the image sensor 103. A sample-and-hold (S/H) circuit 107 is arranged to sample and hold the photo-electrically converted signal coming from the image sensor 103. An automatic gain control (AGC) circuit 108 is arranged to electrically amplify the signal. A camera signal processing circuit 109 is arranged to form a standard TV signal by carrying out gamma correction, color separation and color-difference matrixing processes, etc., on a signal from the AGC circuit 108 and by adding a synchronizing signal to the signal thus processed. The signal is processed in the form of analog signals.

The camera signal processing circuit 109 is not limited to the conventional analog signal processing arrangement but may be replaced with a digital signal processing circuit which has recently come to be arranged to process signals in the form of digital signals and, after that, to carry out digital-to-analog conversion. A video tape recorder (VTR) 110 is arranged to record a video signal on a recording medium such as a magnetic tape. An electronic viewfinder 111 (hereinafter referred to as EVF) is provided for monitoring a video image being taken. An AE (automatic exposure) detection circuit 112 is arranged to detect the luminance level of the signal from the AGC circuit 108 and to detect a state of exposure for the object of shooting through the luminance level detected. An exposure control circuit 113 is arranged to control, on the basis of the detection signal of the AE detection circuit 112, the amount of opening (aperture state) of the iris mechanism 102, the storage time, i.e., the shutter speed of the electronic shutter which is controlled by the image sensor control circuit 106, the gain of the AGC circuit 108, etc. An iris driving circuit 114 is arranged to operate a motor 105 which drives the iris mechanism 102. An exposure setting key 115 is arranged to be used for setting an exposure in a manual exposure control mode. An exposure control auto/manual selection key 116 is provided for exposure control mode selection.

A zoom position detecting circuit 117 is arranged to detect the zoom (focal length) position of the zoom lens 101. A zoom motor 118 is arranged to vary the magnifying power, i.e., the focal length, of the zoom lens 101. A zoom driving circuit 119 is arranged to drive the zoom motor 118. A logic control circuit 120 is arranged to generate and control a logic signal for controlling the zoom driving circuit 119 in driving the zoom lens 101. A zoom switch 121 is provided for varying the magnifying power. In other words, when the operator pushes the zoom switch 121, the logic control circuit 120 sends a driving signal to the zoom driving circuit 119 for operating the motor 118 to vary the magnifying power of the zoom lens 101.

In the image pickup apparatus which is arranged as described above, to make it possible to obtain optimum video images by a simple shooting operation in various places and under various conditions, changes in the state of exposure due to changes in the object of shooting is detected from a video signal by the AE detection circuit 112, and the exposure control circuit 113 operates on the basis of the detection signal of the AE detection circuit 112 to select exposure control parameters such as the aperture state of the iris mechanism 102, the speed of the electronic shutter which controls the storage time of the image sensor 103, the gain of the AGC circuit 103, etc., and to determine the amounts of correction of those parameters as applicable. Therefore, the control can be always carried out to stably optimize the exposure. The automatic exposure control thus can be most appositely carried out without having recourse to any manipulation.

In shooting an object of a low luminance, the control signal is outputted from the exposure control circuit 113 to the iris driving circuit 114 to drive the iris motor 105 to mechanically open the aperture of the iris mechanism 102 to its full extent to obtain a maximum quantity of incident light. Then, if the luminance of the object is still too low with the iris mechanism 102 fully opened, the exposure control circuit 113 acts to increase the sensitivity of the apparatus by raising the gain of the AGC circuit 108.

The inside of the exposure control circuit 113 is arranged as follows. The exposure control circuit 113 includes an AGC control part 113a, an electronic shutter control part 113b and an iris control part 113c. The AGC control part 113a is arranged to vary the gain of the AGC circuit 108 by controlling it. The electronic shutter control part 113b is arranged to vary the speed of the electronic shutter by controlling the image sensor control circuit 106. The iris control part 113c is arranged to control the amount of opening (aperture) of the iris mechanism 102 by controlling the iris driving circuit 114.

The exposure control circuit 113 further includes an automatic exposure control part 113e, which is arranged to supply control signals to the AGC control part 113a, the electronic shutter control part 113b and the iris control part 113c for automatic control over the iris mechanism 102, the storage time of the image sensor 102 (electronic shutter speed) and the gain of the AGC circuit 108. The exposure control circuit 113 further includes a look-up table (LUT) 113h which is provided for manual exposure control and stores control information to be used by the AGC control part 113a, the electronic shutter control part 113b and the iris control part 113c according to an operation on the exposure setting key 115 in the event of manual exposure control.

Further, with regard to the iris control, the value of control information read out from the look-up table 113h is compared with an aperture value obtained from the iris encoder 104 by a comparison circuit 113g. Then, an actual opening amount of the iris mechanism 102 can be adjusted to a manually set aperture value by controlling the amount of opening of the iris mechanism 102 in such a way as to have the two values come to coincide with each other.

A correction value computing circuit 113f is arranged within the exposure control circuit 113 to apply some correction to the output of the comparison circuit 113g. By this, for example, the fluctuations and non-linearity of characteristic of the iris mechanism 102 can be prevented.

A switch circuit 113d is arranged also within the exposure control circuit 113 to switch the automatic exposure control mode over to the manual exposure control mode and vice versa in response to the operation of the exposure control auto/manual selection key 116. The position of each of switches included in the switch circuit 113d is shifted to a contact A when the automatic exposure control mode is selected by the selection key 116 and to another contact M when the manual exposure control mode is selected. With the automatic exposure control mode selected, the switch circuit 113d connects the automatic exposure control part 113e to the AGC control part 113a, the electronic shutter control part 113b and the iris control part 113c, respectively.

When the manual exposure control mode is selected by the auto/manual selection key 116, the switches included in the switch circuit 113d respectively connect the applicable outputs of the look-up table 113h to the AGC control part 113a, the electronic shutter control part 113b and the iris control part 113 (through the comparison circuit 113g and the correction value computing circuit 113f) to permit the manual exposure control.

The embodiment which is arranged in the above-stated manner is normally set in the automatic exposure control mode. In this mode, any change in the state of exposure caused by a change taking place in the object of shooting is detected by the AE detection circuit 112 through a video signal. Then, the exposure control circuit 113 selects the exposure control parameters including the aperture of the iris mechanism 102, the speed of the electronic shutter which controls the storage time of the image sensor 103 and the gain of the AGC circuit 108 and determines a correction value for each of the parameters on the basis of the detection signal of the AE detection circuit 112, so that the control can be accomplished to always stably give an optimum state of exposure.

It is a feature of this embodiment that a full-open aperture data table 122 for correction of spherical aberration is arranged within the exposure control circuit 113 to store full-open aperture data to be used for correction of the spherical aberration of the zoom lens 101. The data table 122 is arranged to be controlled by the logic control circuit 120. The aperture value is controlled by controlling the iris control part 113c on the basis of the data outputted from the spherical-aberration-correcting full-open aperture data table 122.

With an AE system arranged in the above-stated manner, the iris mechanism 102 is opened to a maximum extent in the event of an object of a low luminance as mentioned above. This invention is developed to improve the quality of an image of a low luminance object obtained with the iris mechanism 102 opened to a maximum extent.

Figure 9:
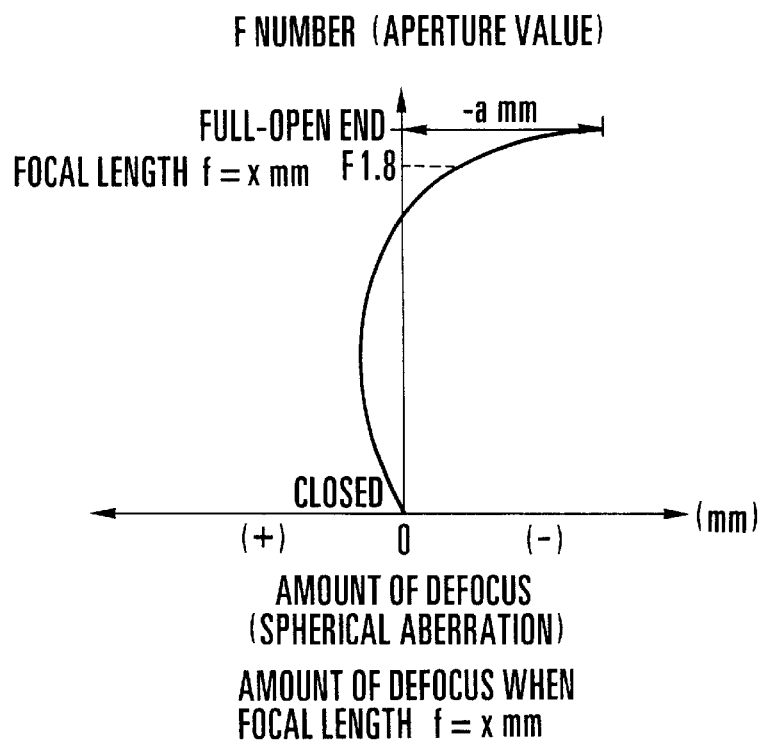
FIG. 9 is a characteristic view showing the relation of a focal length to spherical aberration.

When a lens is arranged to have a smaller size and a lighter weight, it becomes difficult to let the lens have adequate characteristics. For example, the amount of defocus (spherical aberration) tends to increase when the iris is fully opened. FIG. 9 shows the defocus amount characteristic of such a lens.

The amount of defocus varies with the focal length of the lens. In FIG. 9, the characteristic shown is obtained at an arbitrary focal length, f=x mm. As apparent from the characteristic shown, the amount of defocus increases when the iris is fully opened.

Figure 10:
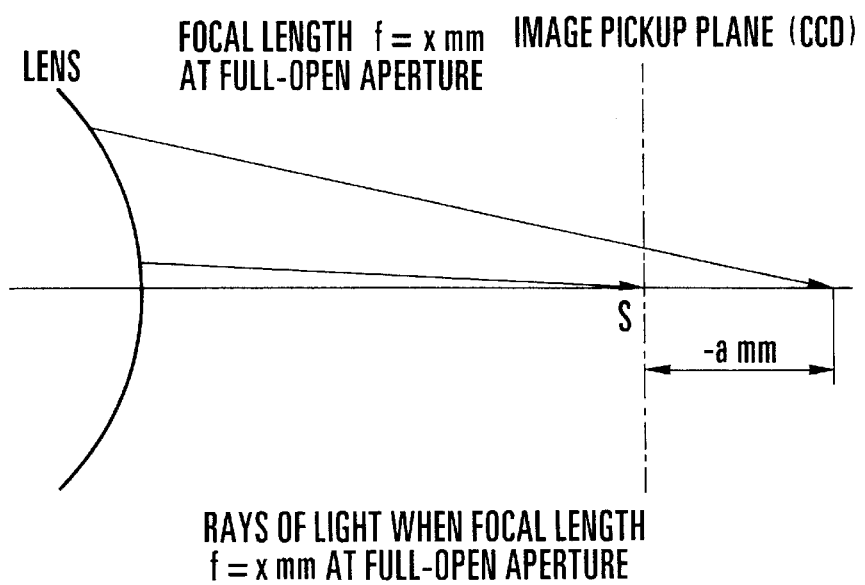
FIG. 10 shows how a defocus state takes place at a full-open aperture due to spherical aberration.

In FIG. 10, this state of defocus is more clearly shown through a state of rays of light. As shown in FIG. 10, the rays of light forming an image on the image pickup plane S (the surface of a CCD in this instance) indicate a discrepancy of "a mm" between a ray of light incident on a peripheral part of the lens and another ray of light incident on a part near the center of the lens. As a result, on the image pickup plane, there arises a phenomenon called "flare" showing something like a seepage of light to give a blurred, deteriorated image.

Since the spherical aberration varies with the aperture value, this embodiment is arranged to eliminate the flare phenomenon which takes place at the full-open aperture state of the iris by electrically limiting the maximum aperture of the iris to an aperture state where spherical aberration takes place in a less amount.

Referring to FIG. 9, for example, the maximum allowable aperture of the iris at the focal length of "f=X mm" is limited to the aperture state of "F 1.8" where the spherical aberration is still acceptable. With the iris not allowed to open any further, the flare phenomenon can be prevented. In other words, the full-open F number for an arbitrary focal length x mm (f=x mm) is electrically limited to an F number state (F 1.8 in this instance) where the flare phenomenon does not take place, so that the image quality can be effectively prevented from being deteriorated by the flare phenomenon.

It is an object of this invention to limit the maximum aperture (full-open F number) state for each of different focal lengths. The invented arrangement in this respect is as shown in FIG. 11.

Referring to FIG. 8, when the operator operates the zoom switch 121 for zooming, a signal for driving the zoom lens 101 is supplied by pushing pressure on the zoom switch 121 to the zoom driving circuit 119 to cause it to drive the zoom motor 118. The zoom position detecting circuit 117 then detects a zoom position (focal length). Information on the zoom position detected is supplied to the logic control circuit 120. The logic control circuit 120 then supplies a zoom position signal to the exposure control circuit 113.

At the exposure control circuit 113, the stored data of full-open (maximum) aperture value at which spherical aberration can be corrected for each of focal lengths is read out from the full-open aperture data table 122 provided for the correction of spherical aberration. The data read out from the data table 122 is supplied to the iris control part 113c to cause the full-open aperture value to be limited according to the data for the focal length inputted. Through these processes, a full-open aperture value at which the spherical aberration can be corrected is selected.

Figure 11:
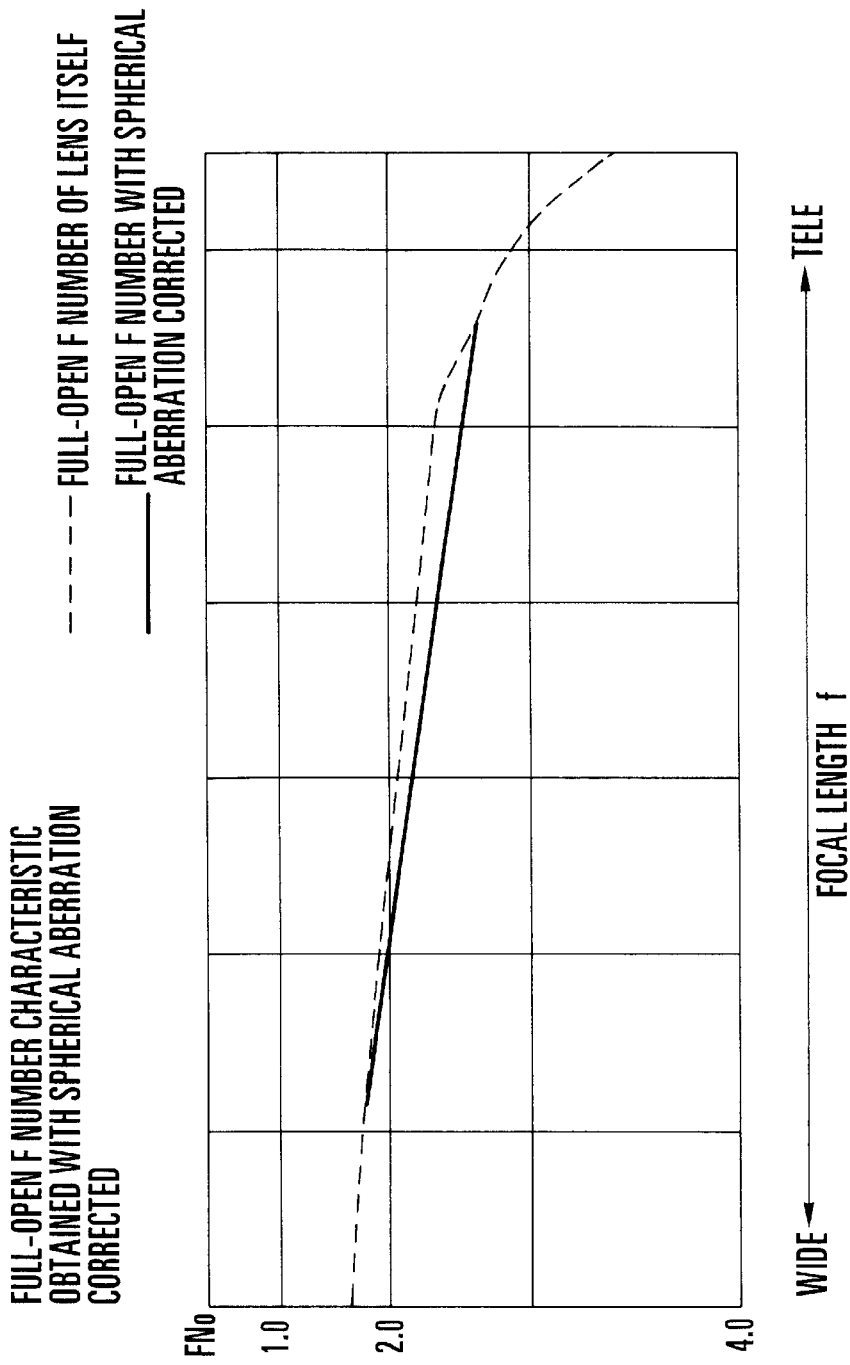
FIG. 11 shows how the full-open aperture is limited according to the focal length.

FIG. 11 shows the spherical aberration correcting F numbers (aperture values). In FIG. 11, a broken line indicates how the full-open F number of the lens varies accordingly as the focal length of the lens varies. A full line represents the spherical-aberration correcting full-open F numbers (maximum aperture values) by which the spherical aberration can be corrected in accordance with this invention and shows how these values vary with the focal length. The maximum aperture is electrically limited by the embodiment to prevent the iris from opening any further than its position defined by the full line.

The embodiment is arranged, as described above, to give a high-resolution image with little flare by detecting a zoom position with the zoom position detecting circuit 117 and by limiting the maximum aperture value for each focal length to an aperture value where the lens in use has no spherical aberration through the logic control circuit 120 and the exposure control circuit 113. The logic control circuit 120 and the exposure control circuit 113 may be arranged in one control circuit.

Further, this invention is not limited to the control over the full-open aperture value but includes also an arrangement of limiting aperture values for some of the focal lengths to an aperture value at which the spherical aberration of the lens can be corrected.

According to the arrangement of the embodiment, as described in the foregoing, a high-resolution image with little flare can be obtained by limiting the aperture of the iris usable for each focal length to an aperture value at which the lens has little spherical aberration.

The embodiment of this invention has a great practical advantage as it is capable of mitigating by simple means the deterioration of characteristics of lenses which is becoming more serious accordingly as the reduction in size and the increase in magnifying power of lenses advance further.

What is claimed is:

1. An image pickup apparatus comprising:
    a zoom lens;
    an image sensor for photo-electronically converting light incident through said zoom lens into an image signal;
    exposure adjusting means for adjusting a plurality of exposure control parameters in response to a level of image signal so as to control an exposure state;
    AE lock means for locking the exposure state controlled by said exposure adjusting means and storing a control value corresponding to the locked exposure state to inhibit the adjustment of said exposure adjusting means, even if the level of the image signal is changed due to a change of an object;
    focal length detecting means for detecting a focal length of said zoom lens; and
    exposure control means, in the case that the exposure state is locked by said AE lock means, for inhibiting a change of the exposure state due to a change of the level of the image signal and for correcting at least one of the exposure control parameters in response to a change of the focal length detected by said focal length detecting means to maintain the stored control value by canceling a change of an F-number due to a change of the focal length.

2. An apparatus according to claim 1, wherein said signal processing means includes automatic gain control means for electrically amplifying the video signal, and wherein said exposure correcting means is arranged to correct the state of exposure by controlling a gain of said automatic gain control means according to a change of the focal length of said zoom lens.

3. An apparatus according to claim 1, wherein said exposure control means has an electronic shutter function to control a storage time of said image sensor, and wherein said exposure correcting means is arranged to correct the state of exposure by controlling the storage time of said image sensor according to a change of the focal length of said zoom lens.

4. An apparatus according to claim 1, wherein said signal processing means has automatic gain control means for electrically amplifying a video signal and said exposure control means has an electronic shutter function to control a storage time of said image sensor, and wherein said exposure correcting means is arranged to correct the state of exposure by controlling a gain of said automatic gain control means and the storage time of said image sensor according to a change of the focal length of said zoom lens.

5. An image pickup apparatus comprising:
    a zoom lens;
    an image sensor for photo-electronically converting light incident through said zoom lens into an image signal;
    iris means for limiting a quantity of light incident on said image sensor;
    aperture state detecting means for detecting the aperture state of said iris means;
    exposure adjusting means for adjusting said iris means in response to a level of image signal so as to control an exposure state;
    AE lock means for locking the exposure state controlled by said exposure adjusting means and storing a control value corresponding to the locked exposure state to inhibit the adjustment of said exposure adjusting means even if the level of the image signal is changed due to a change of an object;
    focal length detecting means for detecting a focal length of said zoom lens; and
    exposure control means, in the case that the exposure state is locked by said AE lock means, for inhibiting a change of exposure state due to a change of the level of the image signal and for correcting at least one of the exposure control parameters in response to a change of the focal length detected by said focal length detecting means to maintain the stored control value by canceling a change of an F-number due to a change of the focal length.

6. An apparatus according to claim 5, wherein said signal processing means includes automatic gain control means for electrically amplifying the video signal, and wherein said exposure correcting means is arranged to correct the state of exposure by controlling a gain of said automatic gain control means according to a change of the focal length of said zoom lens.

7. An apparatus according to claim 5, wherein said exposure control means has an electronic shutter function to control a storage time of said image sensor, and wherein said exposure correcting means is arranged to correct the state of exposure by controlling the storage time of said image sensor according to a change of the focal length of said zoom lens.

8. An apparatus according to claim 5, wherein said signal processing means has automatic gain control means for electrically amplifying the video signal and said exposure control means has an electronic shutter function to control a storage time of said image sensor, and wherein said exposure correcting means is arranged to correct the state of exposure by controlling a gain of said automatic gain control means and the storage time of said image sensor according to a change of the focal length of said zoom lens.

9. An image pickup apparatus comprising:

image pickup means;

an iris for adjusting a quantity of light incident on said image pickup means;

exposure control means for controlling said iris;

magnification varying means for varying a magnification; and control means for controlling an amount of full opening of said iris according to an operating state of said magnification varying means, such as to reduce an aberration of said magnification varying means.

10. An apparatus according to claim 9, wherein said control means is arranged to limit a full-open aperture value of said iris.

11. An apparatus according to claim 10, wherein said magnification varying means is a zoom lens, and wherein said control means is arranged to correct the full-open aperture value which varies according to a focal length of said zoom lens, in such a way as to mitigate an adverse effect of spherical aberration of said zoom lens.

12. An apparatus according to claim 11, wherein said control means has a memory in which a relationship between the focal length and the full-open aperture value is stored.

13. An apparatus according to claim 12, wherein said control means further has a data table in which information about the spherical aberration and aperture value data for correction of the spherical aberration is stored.

14. A camera apparatus comprising:

zooming means for optically zooming an image;

exposure adjusting means for adjusting a plurality of exposure control parameters in response to a level of image signal so as to control an exposure state;

AE lock means for locking the exposure state controlled by said exposure adjusting means and storing a control value corresponding to the locked exposure state to inhibit the adjustment of said exposure adjusting means, even if the level of the image signal is changed due to a change of an object;

detecting means for detecting a magnification of said zooming means; and exposure control means, in the case that the exposure state is locked by said AE lock means, for inhibiting a change of the exposure state due to a change of the level of the image signal and for correcting at least one of the exposure control parameters in response to a change of the magnification of said zooming means detected by said detecting means to maintain the stored control value.

15. A camera apparatus according to claim 14, wherein said zooming means includes a zooming lens and said detecting means detects a focal length of said zooming lens.

16. A camera apparatus according to claim 15, wherein said exposure control means includes an iris and a shutter.

17. A camera apparatus according to claim 16, wherein said control means corrects shutter speed of said shutter on the basis of the magnification of said zooming means.

18. A camera apparatus according to claim 16, further comprising an image sensor, processing circuit for performing a predetermined process on an image signal output from said image sensor and a gain control circuit for controlling a gain for amplifying the image signal, wherein said control means controls the gain on the basis of the magnification of said zooming means.

19. A camera apparatus according to claim 14, wherein said control means includes a data table stored a plurality of correcting values for correcting the exposure condition.

* * * * *

UNITED STATES PATENT AND TRADEMARK OFFICE
CERTIFICATE OF CORRECTION

PATENT NO. : 6,707,500 B1
DATED : March 16, 2004
INVENTOR(S) : Kyoji Tamura

It is certified that error appears in the above-identified patent and that said Letters Patent is hereby corrected as shown below:

Column 1,
Line 49, delete "circuit is" and insert -- circuit 10 is --.

Column 12,
Line 34, delete "f=Xmm" and insert -- f=x mm --.

Signed and Sealed this

Seventh Day of March, 2006

JON W. DUDAS
*Director of the United States Patent and Trademark Office*